US012719394B2

(12) United States Patent
Lu et al.

(10) Patent No.: US 12,719,394 B2
(45) Date of Patent: Aug. 25, 2026

(54) COMPENSATION SYSTEM AND METHOD FOR ZERO-CROSSING VOLTAGE OF BACK ELECTROMOTIV FORCE OF BRUSHLESS DIRECT CURRENT MOTOR

(71) Applicant: JIANGSU DONGCHENG TOOLS TECHNOLOGY CO., LTD., Nantong (CN)

(72) Inventors: Chunlei Lu, Nantong (CN); Ruifeng Lu, Nantong (CN); Jie Zhu, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 234 days.

(21) Appl. No.: 18/725,776

(22) PCT Filed: Oct. 12, 2023

(86) PCT No.: PCT/CN2023/124354

§ 371 (c)(1),
(2) Date: Jun. 30, 2024

(87) PCT Pub. No.: WO2024/078595

PCT Pub. Date: Apr. 18, 2024

(65) Prior Publication Data

US 2025/0070703 A1 Feb. 27, 2025

(30) Foreign Application Priority Data

Oct. 13, 2022 (CN) ........................ 202211251432.0

(51) Int. Cl.
*H02P 23/00* (2016.01)
*H02P 25/03* (2016.01)

(52) U.S. Cl.
CPC .............. *H02P 23/00* (2013.01); *H02P 25/03* (2016.02)

(58) Field of Classification Search
CPC ...... H02P 23/0004; H02P 23/00; H02P 25/03; H02M 7/797
See application file for complete search history.

(56) References Cited

U.S. PATENT DOCUMENTS 9,190,935 B2 * 11/2015 Takase .................. H02M 7/797
2004/0263113 A1 12/2004 Kim
2005/0275362 A1 * 12/2005 Yamamoto .......... H02P 23/0004 318/400.18

FOREIGN PATENT DOCUMENTS

CN 105958874 A 9/2016
CN 107482962 A 12/2017
(Continued)

OTHER PUBLICATIONS

International Search Report, International Application No. PCT/CN2023/124354, mailed Dec. 25, 2023 (13 pages).
(Continued)

*Primary Examiner* — Cortez M Cook

(57) ABSTRACT

A compensation system and method for a zero-crossing voltage of back electromotive force of a brushless direct current motor (BLDCM) are provided. The compensation system includes: a direct current power supply; a three-phase inverter, connected to the direct current power supply and the BLDCM; a back electromotive force detection module configured to detect terminal voltages of three phases when the BLDCM is in operation; and a controller, connected to the three-phase inverter through the back electromotive force detection module. The compensation system further includes a current acquisition module connected between the direct current power supply and the controller, and the current acquisition module is configured
(Continued)

to acquire a bus current value when the BLDCM is in operation; the controller includes a voltage compensation module connected to the back electromotive force detection module. A bus current threshold is preset in the voltage compensation module.

20 Claims, 5 Drawing Sheets

(56) References Cited

FOREIGN PATENT DOCUMENTS

| | | | |
|---|---|---|---|
| CN | 208158473 | U | 11/2018 |
| CN | 109167539 | A | 1/2019 |
| CN | 109546903 | B | 9/2021 |
| CN | 114362608 | A | 4/2022 |
| CN | 115664275 | A | 1/2023 |
| KR | 20150031356 | A | 3/2015 |

OTHER PUBLICATIONS

Chinese First Office Action, Chinese Application No. 202211251432.0, mailed Feb. 17, 2025 (11 pages).

Chinese Notification to Grant Patent Right for Invention, Chinese Application No. 202211251432.0, mailed Apr. 3, 2025 (3 pages).

* cited by examiner

COMPENSATION SYSTEM AND METHOD FOR ZERO-CROSSING VOLTAGE OF BACK ELECTROMOTIV FORCE OF BRUSHLESS DIRECT CURRENT MOTOR

CROSS REFERENCE TO RELATED APPLICATIONS

The present application is a 35 U.S.C. 371 National Phase Application of International Patent Application No. PCT/CN2023/124354, filed on Oct. 12, 2023, which claims foreign priority to Chinese Patent Application No. 202211251432.0, filed on Oct. 13, 2022, both of which are hereby incorporated by reference in their entirety.

TECHNICAL FIELD

The present disclosure relates to the field of brushless motor control, in particular to a compensation system for a zero-crossing voltage of back electromotive force of a brushless direct current motor, and a compensation method for a zero-crossing voltage of back electromotive force of a brushless direct current motor.

BACKGROUND

A brushless direct current motor (BLDCM) is a typical electromechanical integrated product composed of a motor body and a driver. Since the BLDCM has advantages of high-power density, high efficiency, low maintenance cost, simple structure, and easy control, etc., the BLDCM is widely used in various fields, such as automobiles, tools, industrial control, automation, aerospace, etc.

In recent years, a position-sensorless control for the BLDCM has always been a research hotspot at home and abroad. Common methods for detecting rotor position signals include a back electromotive force method, a stator inductance method, a freewheeling diode method, a flux estimation method, a state observer method, etc., where the back electromotive force method is the most effective and practical.

The BLDCM generally operate in a mode of two-phase conduction and three-phase six-state. The back electromotive force method is to obtain a zero-crossing point of back electromotive force by comparing a sum of terminal voltages of two conduction phases with a terminal voltage of a suspended phase. For example, if three phases are a U-phase, a V-phase, and a W-phase, the W-phase is a suspended phase when the U-phase and the V-phase are conducting. When a controller detects that a terminal voltage of the W-phase (i.e. the back electromotive force) is equal to half of a sum of a terminal voltage of the U-phase and a terminal voltage of the V-phase, the controller determines a zero-crossing point of the terminal voltage of the W-phase (i.e. a zero-crossing point of back electromotive force).

During actual use of the BLDCM, it is found that as the load increases, a bus current will increase, resulting in making a voltage of a power supply drop sharply. In this way, a determination reference of the zero-crossing voltage of back electromotive force experiences step-down offset, that is, a sum of the voltages of the two conduction phases decreases, resulting in two disadvantages: (1) when the back electromotive force is at a rising edge, the controller detects the zero-crossing point of back electromotive force in advance, causing an early commutation of the BLDCM; (2) when the back electromotive force is at a falling edge, the controller detect of the zero-crossing point of back electromotive force with a delay, causing a delayed commutation of the BLDCM. The above-mentioned two disadvantages lead to inconsistent commutation time of the BLDCM, thereby affecting accurate commutation of the BLDCM. In addition, the early or delayed commutation of the BLDCM may lead to inconsistent frequency of the bus current, and in severe cases, it may cause an abnormal operating performance of the BLDCM, resulting in reducing the operation efficiency.

Patent No. CN109546903B discloses a compensation method for voltage sampling offset of a position-sensorless BLDCM. The compensation method includes: obtaining $T_{pos}$ by exclusive OR (XOR) operation on three virtual Hall signals $T_a$, $T_b$, and $T_c$; calculating the $T_{pos}$ as a high-level duration, and calculating the $T_{pos}$ as a low-level duration; calculating a motor speed by using a speed formula; and calculating delay time of the three virtual Hall signals $T_a$, $T_b$, and $T_c$, and obtaining new commutation signals $S_a$, $S_b$, and $S_c$, so as to drive the BLDCM to operate. The above technical solution solves a problem that due to the insufficient sensitivity of the voltage sensor and the zero-drift of the operational amplifier in the filter circuit, a sampled line voltage difference or a terminal voltage signal may be offset, leading to an issue with unbalanced zero-crossing points. However, the above technical solution fails to solve the problem that as the load increases, the bus current will increase, which makes the power source voltage drop sharply, thus causing the step-down offset of the determination reference of the zero-crossing voltage of back electromotive force.

Therefore, in order to solve the above problem, it is necessary to provide a compensation system and a compensation method for a zero-crossing voltage of back electromotive force of a BLDCM.

SUMMARY OF THE DISCLOSURE

According to a first aspect, the present disclosure provides a compensation system for a zero-crossing voltage of back electromotive force of a BLDCM. The compensation system includes: a direct current power supply; a three-phase inverter, connected to the direct current power supply and the brushless direct current motor; a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module; wherein the compensation system further comprises a current acquisition module connected between the direct current power supply and the controller, and the current acquisition module is configured to acquire a bus current value in response to the brushless direct current motor being in operation; the controller comprises a voltage compensation module connected to the back electromotive force detection module, and a bus current threshold is preset in the voltage compensation module; the voltage compensation module is configured to compare the bus current value with the bus current threshold, and output a corresponding voltage compensation signal based on a comparison result therebetween; and the controller is configured to compensate a zero-crossing voltage of back electromotive force of the brushless direct current motor based on the voltage compensation signal, and control the brushless direct current motor to perform a commutation operation.

According to a second aspect, the present disclosure provides a compensation system for a zero-crossing voltage of back electromotive force of a BLDCM. The compensation system includes: a direct current power supply; a three-phase inverter, connected to the direct current power supply and the brushless direct current motor; a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module; wherein the compensation system further comprises a current acquisition module connected between the direct current power supply and the controller, and the current acquisition module is configured to acquire a bus current value in response to the brushless direct current motor being in operation; the controller comprises a voltage compensation module connected to the back electromotive force detection module, and a plurality of groups of bus current threshold intervals are preset in the voltage compensation module; the voltage compensation module is configured to determine a group of bus current threshold intervals where the bus current value is located and output a corresponding voltage compensation signal based on the group of bus current threshold intervals; and the controller is configured to compensate a zero-crossing voltage of back electromotive force of the brushless direct current motor based on the voltage compensation signal, and control the brushless direct current motor to perform a commutation operation.

According to a third aspect, the present disclosure provides a compensation method for a zero-crossing voltage of back electromotive force of a BLDCM. The compensation method is applied to the compensation system for zero-crossing voltage of back electromotive force of a BLDCM. The compensation method includes the following blocks:

- block S1, acquiring, by the current acquisition module, the bus current value, in response to the brushless direct current motor being in operation;
- block S2, acquiring in real time, by the controller, the terminal voltages of the three phases of the brushless direct current motor through the back electromotive force detection module, and calculating half of the sum of terminal voltages of the two conduction phases;
- block S3, detecting in real time, by the controller, whether the terminal voltage of the suspended phase is equal to half of the sum of terminal voltages of the two conduction phases, and at the same time, determining in real time, by the controller, a bus current threshold interval where the bus current value is located; and the compensation method further includes one of the following blocks:
- block S4, determining, by the controller, the zero-crossing voltage of back electromotive force of the brushless direct current motor being half of the sum of terminal voltages of the two conduction phases, in response to the bus current value being a low threshold interval; and determining, by the controller, the zero-crossing point of back electromotive force of the brushless direct current motor, and executing the zero-crossing commutation procedure, in response to the controller determining that the terminal voltage of the suspended phase is equal to half of the sum of terminal voltages of the two conduction phases;
- block S5, compensating, by the controller, the zero-crossing voltage of back electromotive force of the brushless direct current motor according to the voltage compensation signal, in response to the bus current value being a high threshold interval; and determining, by the controller, the zero-crossing point of back electromotive force of the brushless direct current motor, and executing the zero-crossing commutation procedure, in response to the controller determines that the terminal voltage of the suspended phase being equal to a compensated zero-crossing voltage of back electromotive force of the brushless direct current motor; and
- block S6, controlling, by the controller, the brushless direct current motor to perform over-current shutdown protection, in response to the bus current value exceeding the high threshold interval.

BRIEF DESCRIPTION OF THE DRAWINGS

The embodiments of the present disclosure will be further described in detail below in conjunction with the accompanying drawings.

Figure 1:
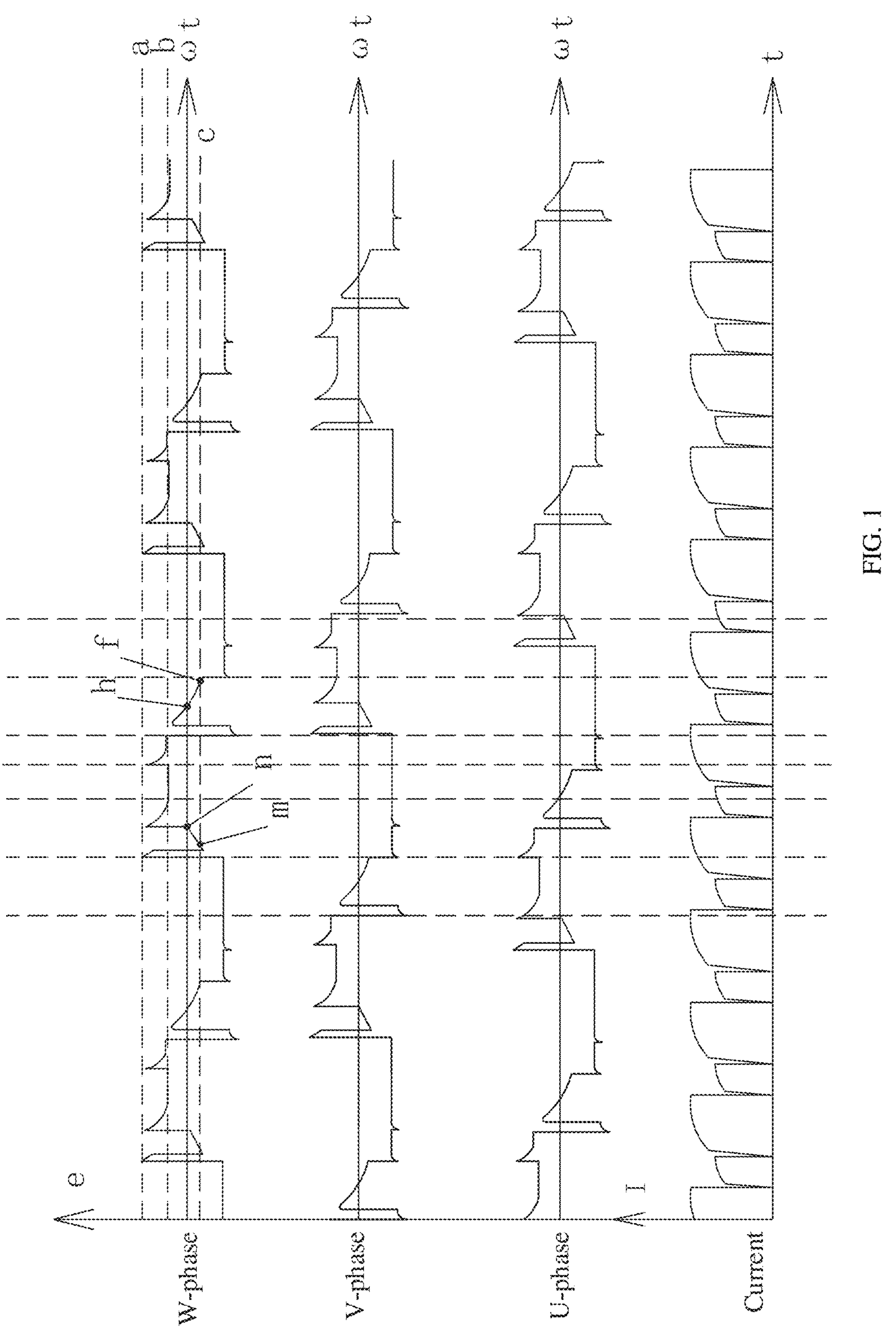
FIG. 1 is a comparison schematic view of waveforms of back electromotive force of three phases, namely U-phase, V-phase, and W-phase and a bus current when a brushless direct current motor (BLDCM) is in operation in the related art.

Reference numerals in drawings: 1, direct current power supply; 2, three-phase inverter; 3, back electromotive force detection module; 4, controller; 5, BLDCM; 6, current acquisition module; 7, voltage compensation module; 8, operation module; 9, memory cell.

DETAILED DESCRIPTION

The present disclosure will be further described in detail below in conjunction with the accompanying drawings and embodiments.

As shown in FIG. 1, a suspended phase being W-phase is taken as an example, there are intersection points n and h of a straight line where a horizontal coordinate ωt is located with a waveform of back electromotive force of the W-phase, and the intersection points n and h represent a zero-crossing point of back electromotive force of the W-phase determined by a controller during the operation of a brushless direct current motor (BLDCM) in the related art. That is, the zero-crossing point of back electromotive force of the W-phase is equal to a point at which a terminal voltage of the W-phase is equal to half of a sum of a terminal voltage of the U-phase and a terminal voltage of the V-phase. A dashed line a represents the terminal voltage of the W-phase of the BLDCM when a bus current value is small. A dashed line b represents the terminal voltage of the W-phase of the BLDCM during operation when the bus current value is high. In the related art, a method for determining a zero-crossing point of back electromotive force is as follows. When a terminal voltage of the suspended phase is equal to half of terminal voltages of two conduction phases (that is, when the terminal voltage of the W-phase is equal to half of the sum of the terminal voltage of the U-phase and the terminal voltage of the V-phase), the controller determines the zero-crossing point of back electromotive force, and then performs a subsequent commutation operation.

As shown in FIG. 1, it can be seen that when the bus current value is high, terminal voltages of three-phases are pulled down, that is, the sum of terminal voltages of the U-phase and the V-phase is reduced, resulting in reducing a determination reference of a zero-crossing voltage of back electromotive force. As shown at intersection points m and f of the dotted line b with the waveform of back electromotive force of the W-phase in FIG. 1, a voltage at the point m is obviously detected in advance, leading to an early commutation of the BLDCM, while a voltage at the point f is obviously detected with a delay, leading to a delayed commutation of the BLDCM. Ultimately, it may lead to an inconsistent bus current frequency, and in severe cases, it may cause an abnormal operating performance of the BLDCM, such as abnormal shutdown of the motor, varying speeds, and other abnormal conditions, which greatly reduces the operation efficiency.

Figure 2:
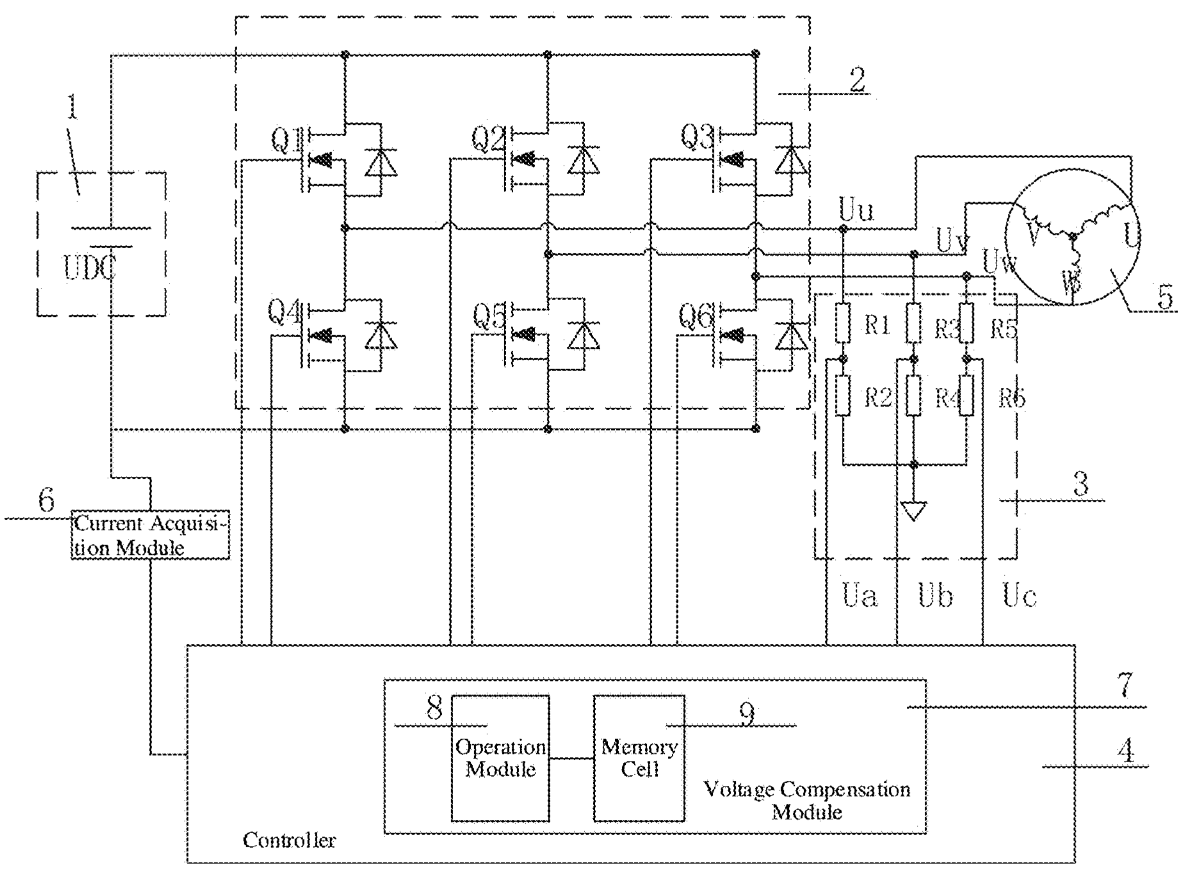
FIG. 2 is a circuit structural schematic view of a compensation system for a zero-crossing voltage of back electromotive force of a BLDCM according to some embodiments of the present disclosure.

Example 1. As shown in FIG. 2, a compensation system for zero-crossing voltage of back electromotive force of a BLDCM is provided. The compensation system includes a direct current power supply 1, a three-phase inverter 2, a back electromotive force detection module 3, and a controller 4. The controller 4 generally uses an MCU controller. The direct current power supply 1 is connected to the three-phase inverter 2, the three-phase inverter 2 is connected to the BLDCM 5, and the controller 4 is connected to the three-phase inverter 2 through the back electromotive force detection module 3. The back electromotive force detection module 3 is configured to detect terminal voltages of three phases when the BLDCM 5 is in operation. The three phases include two conduction phases and one suspended phase. The compensation system further includes a current acquisition module 6 connected to between the Direct current power supply 1 and the controller 4. The current acquisition module 6 is configured to acquire a bus current value when the BLDCM 5 is in operation. The controller 4 includes a voltage compensation module 7 connected to the back electromotive force detection module 3. A bus current threshold is preset in the voltage compensation module 7. The bus current threshold is a reference for determining whether it is necessary to compensate a zero-crossing voltage of back electromotive force of the BLDCM.

The three-phase inverter 2 includes upper bridge switching tubes Q1~Q3, and lower bridge switching tubes Q4~Q6. A drain of each of the upper bridge switching tubes Q1~Q3 is connected to a positive electrode of the direct current power supply 1, a source of each of the lower bridge switching tubes Q4~Q6 is connected to a negative electrode of the direct current power supply 1. The source of the upper bridge switching tube Q1 is connected to the U-phase, the source of the upper bridge switching tube Q2 is connected to the V-phase, the source of the upper bridge switching tube Q3 is connected to the W-phase. A gate of each of the upper bridge switching tubes Q1~Q3 and a gate of each of the lower bridge switching tubes Q4~Q6 are connected to the controller 4. The back electromotive force detection module 3 includes voltage divider resistors R1~R6. The voltage divider resistor R1 is connected in series with the voltage divider resistor R2. An upper end of the voltage divider resistor R1 is electrically connected between the source of the upper bridge switching tube Q1 and the U-phase. A lower end of the voltage divider resistor R2 is grounded. The voltage divider resistor R3 is connected in series with the voltage divider resistor R4. An upper end of the voltage divider resistor R3 is electrically connected between the source of the upper bridge switching tube Q2 and the V-phase. A lower end of the voltage divider resistor R4 is grounded. The voltage divider resistor R5 is connected in series with the voltage divider resistor R6. An upper end of the voltage divider resistor R5 is electrically connected between the source of the upper bridge switching tube Q2 and the W-phase. A lower end of the voltage divider resistor R6 is grounded. The controller 4 is electrically connected between the voltage divider resistors R1 and R2, between the voltage divider resistors R3 and R4, and between the voltage divider resistors R5 and R6. The controller 4 acquires terminal voltages Ua, Ub, and Uc of the U-phase, the V-phase, and the W-phase after being divided by the voltage divider resistors R1~R6, and calculates terminal voltages Uu, Uv, Uw of the U-phase, the V-phase, and the W-phase. These voltages Uu, Uv, and Uw are stored in a memory cell 9. Half of terminal voltages of the two conduction phases are: (Uu+Uv)/2, (Uu+Uw)/2, or (Uv+Uw)/2, where Uu, Uv, and Uw respectively represent the voltage of three-phase line of the U-phase, the V-phase, and the W-phase of the brushless direct current motor to ground.

In the embodiment, the voltage compensation module 7 is configured to compare the bus current value with the bus current threshold, and output a corresponding voltage compensation signal based on a comparison result therebetween. The controller 4 compensates a zero-crossing voltage of back electromotive force of the brushless direct current motor based on the voltage compensation signal, and is configured to control the brushless direct current motor 5 to perform a commutation operation.

In the embodiment, the voltage compensation signal is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient. When the bus current value is less than the bus current threshold, the voltage proportional coefficient is 1, and the controller 4 determines that the zero-crossing voltage of back electromotive force of the BLDCM is half of the sum of terminal voltages of the two conduction phases. When the bus current value is greater than or equal to the bus current threshold, the voltage proportional coefficient is greater than 1, and the controller 4 compensates the zero-crossing voltage of back electromotive force of the BLDCM based on the voltage proportional coefficient.

As further shown in FIG. 1, the voltage compensation module 7 includes an operation module 8 and a memory cell 9. The operation module 8 is connected to the current acquisition module 6 and the back electromotive force detection module 3. The memory cell 9 is connected to the operation module 8. The operation module 8 is configured to compare the bus current value with the bus current threshold, and output the corresponding voltage compensation signal based on the comparison result between the bus current value and the bus current threshold. The bus current threshold is preset in the memory cell 9. The bus current threshold is a reference for determining whether it is necessary to compensate a zero-crossing voltage of back electromotive force of the BLDCM.

In the embodiment, when the terminal voltage of the suspended phase is equal to half of the sum of terminal voltages of the two conduction phases, the controller 4 determines a zero-crossing point of back electromotive force of the BLDCM and executes a zero-crossing commutation procedure. The terminal voltage of the suspended phase is the back electromotive force of the BLDCM 5. The zero-crossing commutation procedure is that the three phases of the BLDCM 5 perform commutation operation. That is, after the zero-crossing point of back electromotive force of the BLDCM is detected by the operation module 8, the controller 4 sets corresponding delay time based on a commutation point being delayed by 30° of an electrical angle from the zero-crossing point. When the delay time reaches, the commutation is performed on the BLDCM 5, and the BLDCM 5 enters a next operation state.

Figure 3:
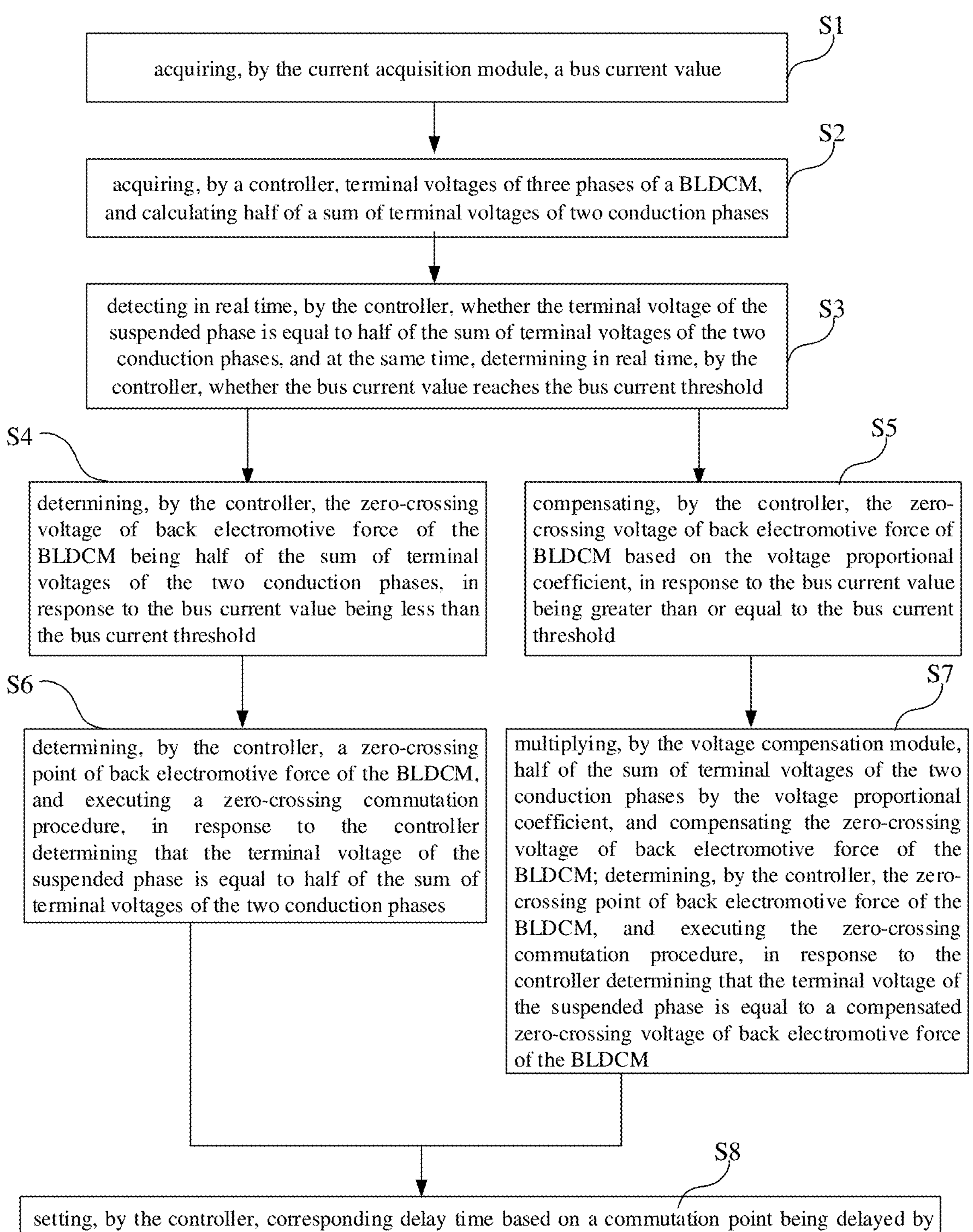
FIG. 3 is a first flowchart of a compensation method for a zero-crossing voltage of back electromotive force of a BLDCM according to some embodiments of the present disclosure.

FIG. 3 illustrates a first flowchart of a compensation method for zero-crossing voltage of back electromotive force of BLDCM according to some embodiments of the present disclosure. The compensation method is applied to the compensation system for zero-crossing voltage of back electromotive force of BLDCM. The compensation method includes the following operations.

At block S1, the BLDCM 5 is in operation, and the current acquisition module 6 acquires the bus current value and transmits the bus current value to the controller 4.

At block S2, the controller 4 acquires in real time the terminal voltages of the three phases of the BLDCM 5 through the back electromotive force detection module 3, and calculates half of the sum of terminal voltages of the two conduction phases.

At block S3, the controller 4 detects in real time whether the terminal voltage of the suspended phase is equal to half of the sum of terminal voltages of the two conduction phases, and at the same time, the controller 4 determines in real time whether the bus current value reaches the bus current threshold.

At block S4, when the bus current value is less than the bus current threshold, the controller 4 determines that the zero-crossing voltage of back electromotive force of the BLDCM is half of the sum of terminal voltages of the two conduction phases, and block S6 is entered.

At block S5, when the bus current value is greater than or equal to the bus current threshold, the controller 4 compensates the zero-crossing voltage of back electromotive force of BLDCM based on the voltage proportional coefficient, and block S7 is entered.

At block S6, when the controller 4 determines that the terminal voltage of the suspended phase is equal to half of the sum of terminal voltages of the two conduction phases, the controller 4 determines the zero-crossing point of back electromotive force of the BLDCM, and executes the zero-crossing commutation procedure, and block S8 is entered.

At block S7, the voltage compensation module 7 multiplies half of the sum of terminal voltages of the two conduction phases by the voltage proportional coefficient and compensates the zero-crossing voltage of back electromotive force of the BLDCM. When the controller 4 determines that the terminal voltage of the suspended phase is equal to a compensated zero-crossing voltage of back electromotive force of the BLDCM, the controller 4 determines the zero-crossing point of back electromotive force of the BLDCM, and executes the zero-crossing commutation procedure, and the block S8 is entered.

At block S8, after the zero-crossing point of back electromotive force of the BLDCM is detected by the controller 4, the controller 4 sets corresponding delay time based on a commutation point being delayed by 30° of an electrical angle from the zero-crossing point. When the delay time reaches, the commutation is performed on the BLDCM 5, and the BLDCM 5 enters a next operation state.

A compensation principle for the zero-crossing voltage of back electromotive force of the BLDCM in the embodiment is as follows.

Assuming that a bus current threshold is 40 A, the three phases are denoted as the U-phase, the V-phase, and the W-phase, and the terminal voltages of the three phases are denoted as Uu, Uv, and Uw, respectively. The voltage proportional coefficient greater than 1 is a value of 110%. If the power source voltage is 16V, and MOS tube voltage drop is negligible, half of the sum of terminal voltages of the two conduction phases is 8V. When the bus current value is greater than 40 A, the power source voltage is 14.4V, half of the sum of terminal voltages of the two conduction phases is 7.2V. Specifically, the compensation method includes the following operations.

At block S1, when the BLDCM 5 is in operation, and the current acquisition module 6 acquires the bus current value in real time and transmits the bus current value to the controller 4.

At block S2, the controller 4 acquires in real time the terminal voltages Uu, Uv, and Uw of the U-phase, the V-phase, and the W-phase of the BLDCM through the back electromotive force detection module, and calculates half of the sum of terminal voltages of the two conduction phases. Assuming that the U-phase and the V-phase are two conduction phases at this time, and the W-phase is a suspended phase, half of the sum of terminal voltages of the two conduction phases is (Uu+Uv)/2=8V.

At block S3, the controller 4 detects in real time whether the terminal voltage Uw of the W-phase is equal to 8V, and at the same time, the controller 4 determines in real time whether the bus current value reaches 40 A.

At block S4, when the bus current value is less than 40 A, the controller 4 determines that the zero-crossing voltage of back electromotive force of the BLDCM is 8V. When controller 4 detects that Uw is equal to 8V, the controller 4 determines the zero-crossing point of back electromotive force of the BLDCM and executes the zero-crossing commutation procedure.

At block S5, when the bus current value is greater than or equal to 40 A, the controller 4 compensates the zero-crossing voltage of back electromotive force of the BLDCM according to the voltage proportional coefficient of 110%. That is, at this time, the zero-crossing voltage of back electromotive force of the BLDCM is 7.2V*110%=7.92V. When the controller 4 determines that Uw is equal to 7.92V, the controller 4 determines the zero-crossing point of back electromotive force of the BLDCM, and executes the zero-crossing commutation procedure.

The voltage proportional coefficient may be adjusted according to a reduction extent of the terminal voltages of the two conduction phases during the actual use of the BLDCM 5, so as to ensure that the zero-crossing voltage of back electromotive force of the BLDCM approaches 8V.

In the embodiment, firstly, the bus current threshold is preset in the voltage compensation module 7, so as to divide the voltage compensation reference. Secondly, the voltage compensation module 7 compares the bus current value with the bus current threshold, so as to determine whether the bus current value exceeds the bus current threshold. Then, the voltage compensation module 7 outputs the corresponding voltage compensation signal based on the comparison result between the bus current value and the bus current threshold. Finally, the controller 4 compensates the zero-crossing voltage of back electromotive force of the BLDCM based on the voltage compensation signal. That is, the determination reference of the zero-crossing voltage of the back electromotive force is improved to compensate for the step-down offset of the zero-crossing voltage of the back electromotive force caused by overlarge bus current, thereby improving the commutation precision of the BLDCM 5.

Figure 5:
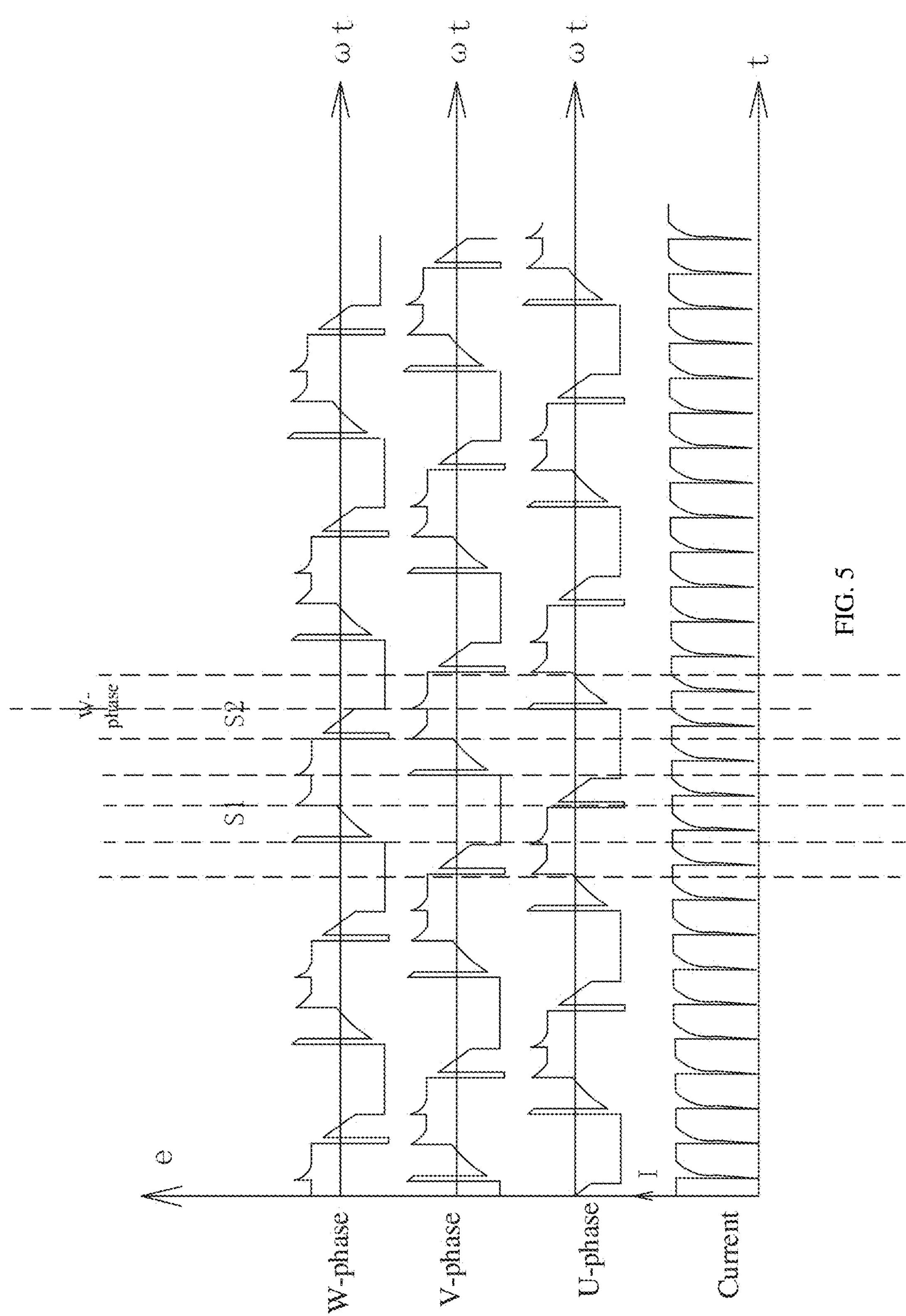
FIG. 5 is a comparison schematic view of waveforms of back electromotive force of three phases, namely U-phase, V-phase, and W-phase and a bus current when a BLDCM is in operation according to some embodiments of the present disclosure.

After the compensation method of the above-mentioned embodiment 1, waveforms of back electromotive force of the three phases, namely the U-phase, the V-phase, and the W-phase, are obviously regular and stable during operation of the BLDCM 5. A duration of a rising edge stage S1 of back electromotive force and a duration of a falling edge stage S2 of back electromotive force also tend to be consistent. At the same time, the bus current is also obviously smooth and orderly, as shown in FIG. 5.

Example 2. As shown in FIG. 2, a compensation system for zero-crossing voltage of back electromotive force of a BLDCM is provided. The compensation system includes a direct current power supply 1, a three-phase inverter 2, a back electromotive force detection module 3, and a controller 4. The controller 4 generally uses an MCU controller. The direct current power supply 1 is connected to the three-phase inverter 2, the three-phase inverter 2 is connected to the BLDCM 5, and the controller 4 is connected to the three-phase inverter 2 through the back electromotive force detection module 3. The back electromotive force detection module 3 is configured to detect terminal voltages of three phases when the BLDCM 5 is in operation. The three phases include two conduction phases and one suspended phase. The compensation system further includes a current acquisition module 6 connected to between the direct current power supply 1 and the controller 4. The current acquisition module 6 is configured to acquire a bus current value when the BLDCM 5 is in operation. The controller 4 includes a voltage compensation module 7 connected to the back electromotive force detection module 3. A plurality of groups of bus current threshold intervals are preset in the voltage compensation module 7. The voltage compensation module 7 is configured to determine a group of bus current threshold intervals where the bus current value is located and output a corresponding voltage compensation signal based on the group of bus current threshold intervals. The Controller 4 compensates a zero-crossing voltage of back electromotive force of BLDCM based on the voltage compensation signal, and is configured to control the BLDCM 5 to perform a commutation operation.

Each of the plurality of groups of the bus current threshold intervals corresponds to a group of voltage compensation signals, respectively. Each of the group of voltage compensation signals is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient. In this way, it may further divide the voltage compensation reference, so as to make the compensation of the zero-crossing voltage of back electromotive force of BLDCM more accurate.

In the embodiment, the each of the group of voltage compensation signals comprises a low threshold interval and a high threshold interval. When the bus current value is in the low threshold interval, the voltage proportional coefficient is 1. When the bus current value is in the high threshold interval, the voltage proportional coefficient is greater than 1.

The high threshold interval includes a first threshold interval, a second threshold interval, and a third threshold interval. The voltage proportion coefficient includes a first proportion coefficient, a second proportion coefficient, and a third proportion coefficient. The first threshold interval corresponds to the first proportion coefficient, the second threshold interval corresponds to the second proportion coefficient, and the third threshold interval corresponds to the third proportion coefficient. The first threshold interval, the second threshold interval, and third threshold interval successively increase. The first proportional coefficient, second proportional coefficient, and third voltage coefficient successively increase.

In the embodiment, when the bus current value is in the low threshold interval, the controller 4 determines that the zero-crossing voltage of back electromotive force of the BLDCM is half of the sum of terminal voltages of the two conduction phases. When the bus current value is in the high threshold interval, the controller 4 compensates the crossing voltage of back electromotive force of BLDCM based on the voltage compensation signal. When the bus current value exceeds the high threshold interval, the controller 4 controls the BLDCM 5 to perform over-current shutdown protection. When the bus current value is in the first threshold interval, the controller 4 compensates the zero-crossing voltage of back electromotive force of BLDCM based on the first proportional coefficient. When the bus current value is in the second threshold interval, the controller 4 compensates the zero-crossing voltage of back electromotive force of the BLDCM based on the second proportional coefficient. When the bus current value is in the third threshold interval, the controller 4 compensates the zero-crossing voltage of back electromotive force of the BLDCM based on the third proportional coefficient.

In the embodiment, when the terminal voltage of the suspended phase is equal to half of the sum of terminal voltages of the two conduction phases, the controller 4 determines the zero-crossing point of back electromotive force of the BLDCM and executes the zero-crossing commutation procedure. The terminal voltage of the suspended phase is the back electromotive force of the BLDCM 5. The zero-crossing commutation procedure is that the three phases of the BLDCM 5 perform commutation operation. That is, after the zero-crossing point of back electromotive force of the BLDCM is detected by the operation module 8, the controller 4 sets corresponding delay time based on a commutation point being delayed by 30° of an electrical angle from the zero-crossing point. When the delay time reaches, the commutation is performed on the BLDCM 5, and the BLDCM 5 enters a next operation state.

Figure 4:
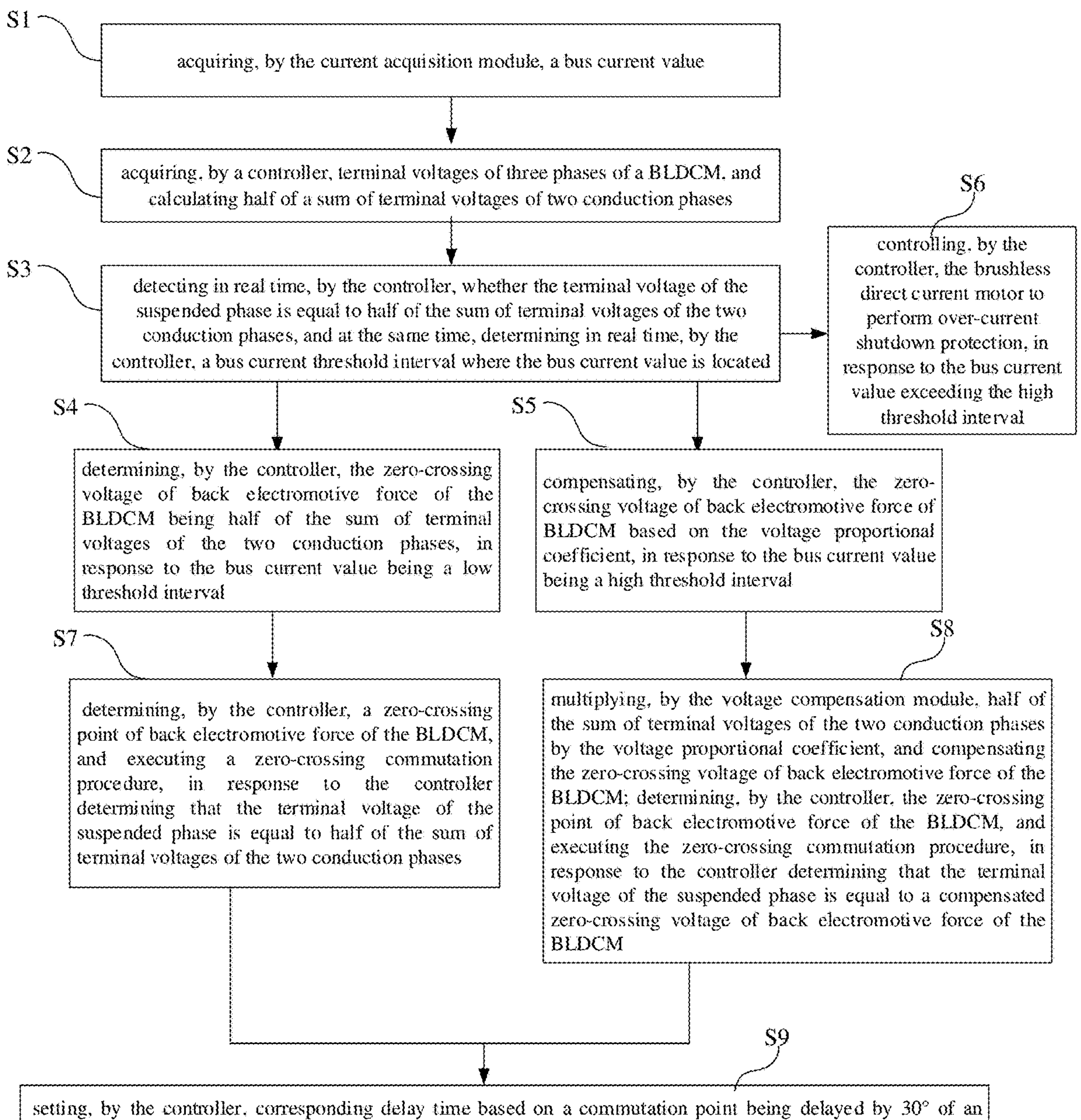
FIG. 4 is a second flowchart of a compensation method for a zero-crossing voltage of back electromotive force of a BLDCM according to some embodiments of the present disclosure.

FIG. 4 illustrates a second flowchart of a compensation method for zero-crossing voltage of back electromotive force of BLDCM according to some embodiments of the present disclosure. The compensation method is applied to the compensation system for zero-crossing voltage of back electromotive force of BLDCM. The compensation method includes the following operations.

At block S1, the BLDCM 5 is in operation, and the current acquisition module 6 acquires the bus current value and transmits the bus current value to the controller 4.

At block S2, the controller 4 acquires in real time the terminal voltages of the three phases of the BLDCM 5 through the back electromotive force detection module 3, and calculates half of the sum of terminal voltages of the two conduction phases.

At block S3, the controller 4 detects in real time whether the terminal voltage of the suspended phase is equal to half of the sum of terminal voltages of the two conduction phases, and at the same time, the controller 4 determines in real time a bus current threshold interval where the bus current value is located.

At block S4, when the bus current value is in a low threshold interval, the controller 4 determines that the zero-crossing voltage of back electromotive force of the BLDCM is half of the sum of terminal voltages of the two conduction phases, and block S7 is entered.

At block S5, when the bus current value is in the high threshold interval, the controller 4 compensates the zero-crossing voltage of back electromotive force of the BLDCM based on the voltage compensation signal, and block S8 is entered.

At block S6, when the bus current value exceeds the high threshold interval, the controller 4 controls the BLDCM 5 to perform over-current shutdown protection.

At block S7, when the controller 4 determines that the terminal voltage of the suspended phase is equal to half of the sum of terminal voltages of the two conduction phases, the controller 4 determines a zero-crossing point of back electromotive force of the BLDCM and executes the zero-crossing commutation procedure, and block S9 is entered.

At block S8, the voltage compensation module 7 the voltage compensation module 7 multiplies half of the sum of terminal voltages of the two conduction phases by the voltage proportional coefficient and compensates the zero-crossing voltage of back electromotive force of the BLDCM. When the controller 4 determines that the terminal voltage of the suspended phase is equal to a compensated zero-crossing voltage of back electromotive force of the BLDCM, the controller 4 determines the zero-crossing point of back electromotive force of the BLDCM, and executes the zero-crossing commutation procedure, and the block S8 is entered.

At block S9, after the zero-crossing point of back electromotive force of the BLDCM is detected by the controller 4, the controller 4 sets corresponding delay time based on a commutation point being delayed by 30° of an electrical angle from the zero-crossing point. When the delay time reaches, the commutation is performed on the BLDCM 5, and the BLDCM 5 enters a next operation state.

A compensation principle for the zero-crossing voltage of back electromotive force of the BLDCM in the embodiment is as follows.

Assuming the following case. That is, the low threshold interval is (0 A, 40 A], and the high threshold interval is (40 A, 80 A], the first threshold interval is (40 A, 50 A], and a corresponding first voltage proportion coefficient is 110%. The second threshold interval is (50 A, 60 A], and a corresponding second voltage proportion coefficient is 115%. The third threshold interval is (60 A, 70 A], and a corresponding third voltage proportion coefficient is 120%. The power source voltage is 16V and voltage reduction of metal-oxide-semiconductor (MOS) field-effect transistor is ignored, and half of the sum of terminal voltages of the two conduction phases is 8V. Specifically, the compensation method includes the following operations.

(1) When the bus current is in the low threshold interval (0 A, 40 A], it is not necessary to compensates the zero-crossing voltage of back electromotive force of the BLDCM. At this time, the voltage proportional coefficient is 1, and when controller 4 detects that the terminal voltage of the suspended phase is equal to 8V, the controller 4 determines the zero-crossing point of back electromotive force of the BLDCM and executes the zero-crossing commutation procedure.

(2) When the bus current is in the first threshold interval (40 A, 50 A], the power source voltage is 14.4V, and half of the sum of terminal voltages of the two conduction phases is 7.2V. After compensated by the first voltage proportional coefficient, the zero-crossing voltage of back electromotive force of the BLDCM is 7.2V*110%=7.92V, approaching 8V.

(3) When the bus current value is in the second threshold interval (50 A, 60 A], the power source voltage is 13.6V, and half of the sum of terminal voltages of the two conduction phases is 6.8V. After compensated by the second voltage proportional coefficient, the zero-crossing voltage of back electromotive force of the BLDCM is 6.8V*115%=7.82V, approaching 8V.

(4) When the bus current value is in the third threshold interval (60 A, 70 A], the power source voltage is 12.8V, and half of the sum of terminal voltages of the two conduction phases is 6.4V. After compensated by the third voltage proportional coefficient, the zero-crossing voltage of back electromotive force of the BLDCM is 6.4V*120%=7.68V, approaching 8V.

(5) When the bus current value exceeds 70 A, the controller 4 controls the BLDCM 5 to perform over-current shutdown protection.

The voltage proportional coefficient may be adjusted according to a reduction extent of the terminal voltages of the two conduction phases during the actual use of the BLDCM 5, so as to ensure that the zero-crossing voltage of back electromotive force of the BLDCM approaches 8V.

The compensation method in the embodiment is to further optimize the compensation method according to the Example 1. Firstly, the plurality of groups of bus current threshold intervals are preset in the voltage compensation module 7, so as to further divide the voltage compensation reference. Secondly, the voltage compensation module 7 determines the group of bus current threshold intervals where the bus current value is located and outputs the corresponding voltage compensation signal based on the group of bus current threshold intervals, thereby further improving the voltage compensation precision. Finally, the controller 4 compensates the zero-crossing voltage of back electromotive force of the BLDCM based on the voltage compensation signal. That is, the determination reference of the zero-crossing voltage of the back electromotive force is further improved to compensate for the step-down offset of the zero-crossing voltage of the back electromotive force caused by overlarge bus current, thereby further improving the commutation precision of the BLDCM 5.

After the compensation method of the above-mentioned embodiment 2, waveforms of back electromotive force of the three phases are obviously regular and stable during operation of the BLDCM 5. A duration of a rising edge stage of back electromotive force and a duration of a falling edge stage of back electromotive force also tend to be consistent. At the same time, the bus current is also obviously smooth and orderly.

A technical solution adopted by some embodiments of the present disclosure is to provide a compensation system for a zero-crossing voltage of back electromotive force of a BLDCM. The compensation system includes: a direct current power supply; a three-phase inverter, connected to the direct current power supply and the brushless direct current motor; a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module; wherein the compensation system further comprises a current acquisition module connected between the direct current power supply and the controller, and the current acquisition module is configured to acquire a bus current value in response to the brushless direct current motor being in operation; the controller comprises a voltage compensation module connected to the back electromotive force detection module, and a bus current threshold is preset in the voltage compensation module; the voltage compensation module is configured to compare the bus current value with the bus current threshold, and output a corresponding voltage compensation signal based on a comparison result therebetween; and the controller is configured to compensate a zero-crossing voltage of back electromotive force of the brushless direct current motor based on the voltage compensation signal, and control the brushless direct current motor to perform a commutation operation.

In some embodiments, the voltage compensation signal is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient.

In some embodiments, in response to the bus current value being less than the bus current threshold, the voltage proportional coefficient is 1, and the controller determines that the zero-crossing voltage of back electromotive force of the brushless direct current motor is half of the sum of terminal voltages of the two conduction phases; and in response to the bus current value being greater than or equal to the bus current threshold, the voltage proportional coefficient is greater than 1, and the controller compensates the zero-crossing voltage of back electromotive force of the brushless direct current motor based on the voltage proportional coefficient.

In some embodiments, the voltage compensation module includes an operation module and a memory cell. The operation module is connected to the current acquisition module and the back electromotive force detection module. The memory cell is connected to the operation module.

In some embodiments, the operation module is configured to compare the bus current value with the bus current threshold, and output the corresponding voltage compensation signal based on the comparison result between the bus current value and the bus current threshold.

In some embodiments, the bus current threshold is preset in the memory cell.

In some embodiments, in response to a terminal voltage of the suspended phase being equal to half of the sum of terminal voltages of the two conduction phases, the controller determines a zero-crossing point of back electromotive force of the brushless direct current motor and executes a zero-crossing commutation procedure, wherein the terminal voltage of the suspended phase is the back electromotive force of the brushless direct current motor.

In some embodiments, the zero-crossing commutation procedure is that the three phases of the BLDCM perform commutation operation, that is, after the zero-crossing point of back electromotive force of the BLDCM is detected by the operation module, the controller sets corresponding delay time based on a commutation point being delayed by 30° of an electrical angle from the zero-crossing point. When the delay time reaches, the commutation is performed on the BLDCM, and the BLDCM enters a next operation state.

Another technical solution adopted by some embodiments of the present disclosure is to provide a compensation method for a zero-crossing voltage of back electromotive force of a BLDCM. The compensation method is applied to the compensation system for zero-crossing voltage of back electromotive force of a BLDCM. The compensation method includes the following blocks:

- block S1, acquiring, by the current acquisition module, the bus current value, and transmitting the bus current value to the controller, in response to the brushless direct current motor being in operation;
- block S2, acquiring in real time, by the controller, the terminal voltages of the three phases of the brushless direct current motor through the back electromotive force detection module, and calculating half of the sum of terminal voltages of the two conduction phases;
- block S3, detecting in real time, by the controller, whether the terminal voltage of the suspended phase is equal to half of the sum of terminal voltages of the two conduction phases, and at the same time, determining in real time, by the controller, whether the bus current value reaches the bus current threshold;
- block S4, determining, by the controller, the zero-crossing voltage of back electromotive force of the BLDCM being half of the sum of terminal voltages of the two conduction phases, in response to the bus current value being less than the bus current threshold, and entering block S6;
- block S5, compensating, by the controller, the zero-crossing voltage of back electromotive force of BLDCM based on the voltage proportional coefficient, in response to the bus current value being greater than or equal to the bus current threshold, and entering block S7;
- block S6, determining, by the controller, a zero-crossing point of back electromotive force of the BLDCM, and executing a zero-crossing commutation procedure, in response to the controller determining that the terminal voltage of the suspended phase is equal to half of the sum of terminal voltages of the two conduction phases, and entering block S8;
- block S7, multiplying, by the voltage compensation module, half of the sum of terminal voltages of the two conduction phases by the voltage proportional coefficient, and compensating the zero-crossing voltage of back electromotive force of the BLDCM; determining, by the controller, the zero-crossing point of back electromotive force of the BLDCM, and executing the zero-crossing commutation procedure, in response to the controller determining that the terminal voltage of the suspended phase is equal to a compensated zero-crossing voltage of back electromotive force of the BLDCM, and entering block S8; and
- block S8, setting, by the controller, corresponding delay time based on a commutation point being delayed by 30° of an electrical angle from the zero-crossing point, after the zero-crossing point of back electromotive force of the BLDCM is detected by the controller; in response to the delay time reaching, performing commutation on the BLDCM, and the BLDCM entering a next operation state.

Another technical solution adopted by some embodiments of the present disclosure is to provide a compensation system for a zero-crossing voltage of back electromotive force of a BLDCM. The compensation system includes: a direct current power supply; a three-phase inverter, connected to the direct current power supply and the brushless direct current motor; a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module; wherein the compensation system further comprises a current acquisition module connected between the direct current power supply and the controller, and the current acquisition module is configured to acquire a bus current value in response to the brushless direct current motor being in operation; the controller comprises a voltage compensation module connected to the back electromotive force detection module, and a plurality of groups of bus current threshold intervals are preset in the voltage compensation module; the voltage compensation module is configured to determine a group of bus current threshold intervals where the bus current value is located and output a corresponding voltage compensation signal based on the group of bus current threshold intervals; and the controller is configured to compensate a zero-crossing voltage of back electromotive force of the brushless direct current motor based on the voltage compensation signal, and control the brushless direct current motor to perform a commutation operation.

In some embodiments, each of the plurality of groups of the bus current threshold intervals corresponds to a group of voltage compensation signals, each of the group of voltage compensation signals is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient.

In some embodiments, the each of the group of voltage compensation signals comprises a low threshold interval and a high threshold interval; in response to the bus current value being in the low threshold interval, the voltage proportional coefficient is 1; and in response to the bus current value being in the high threshold interval, the voltage proportional coefficient is greater than 1.

In some embodiments, the high threshold interval comprises a first threshold interval, a second threshold interval, and a third threshold interval; and the voltage proportional coefficient comprises a first proportional coefficient corresponding to the first threshold interval, a second proportional coefficient corresponding to the second threshold interval, and a third proportional coefficient corresponding to the third threshold interval.

In some embodiments, the first threshold interval, the second threshold interval, and the third threshold interval successively increase, and the first proportional coefficient, the second proportional coefficient, and the third proportional coefficient successively increase.

In some embodiments, in response to the bus current value being in the low threshold interval, the controller determines that the zero-crossing voltage of back electromotive force of the brushless direct current motor is half of the sum of terminal voltages of the two conduction phases; in response to the bus current value being in the first threshold interval, the controller compensates the zero-crossing voltage of back electromotive force of the brushless direct current motor based on the first proportional coefficient; in response to the bus current value being in the second threshold interval, the controller compensates the zero-crossing voltage of back electromotive force of the brushless direct current motor based on the second proportional coefficient; in response to the bus current value being in the third threshold interval, the controller compensates the zero-crossing voltage of back electromotive force of the brushless direct current motor based on the third proportional coefficient; and in response to the bus current value exceeding the high threshold interval, the controller controls the brushless direct current motor to perform over-current shutdown protection.

In some embodiments, in response to the terminal voltage of the suspended phase is equal to half of the sum of terminal voltages of the two conduction phases, the controller determines a zero-crossing point of back electromotive force of the brushless direct current motor and executes the zero-crossing commutation procedure, wherein the terminal voltage of the suspended phase is the back electromotive force of the brushless direct current motor.

In some embodiments, the zero-crossing commutation procedure is that the three phases of the BLDCM perform commutation operation, that is, after the zero-crossing point of back electromotive force of the BLDCM is detected by the operation module, the controller sets corresponding delay time based on a commutation point being delayed by 30° of an electrical angle from the zero-crossing point. When the delay time reaches, the commutation is performed on the BLDCM, and the BLDCM enters a next operation state.

Another technical solution adopted by some embodiments of the present disclosure is to provide a compensation method for a zero-crossing voltage of back electromotive force of a BLDCM. The compensation method is applied to the compensation system for zero-crossing voltage of back electromotive force of a BLDCM. The compensation method includes the following blocks:

block S1, acquiring, by the current acquisition module, the bus current value, and transmitting the bus current value to the controller, in response to the brushless direct current motor being in operation;

block S2, acquiring in real time, by the controller, the terminal voltages of the three phases of the brushless direct current motor through the back electromotive force detection module, and calculating half of the sum of terminal voltages of the two conduction phases;

block S3, detecting in real time, by the controller, whether the terminal voltage of the suspended phase is equal to half of the sum of terminal voltages of the two conduction phases, and at the same time, determining in real time, by the controller, a bus current threshold interval where the bus current value is located;

block S4, determining, by the controller, the zero-crossing voltage of back electromotive force of the BLDCM being half of the sum of terminal voltages of the two conduction phases, in response to the bus current value being a low threshold interval, and entering block S7;

block S5, compensating, by the controller, the zero-crossing voltage of back electromotive force of BLDCM based on the voltage proportional coefficient, in response to the bus current value being a high threshold interval, and entering block S8;

block S6, controlling, by the controller, the brushless direct current motor to perform over-current shutdown protection, in response to the bus current value exceeding the high threshold interval;

block S7, determining, by the controller, a zero-crossing point of back electromotive force of the BLDCM, and executing a zero-crossing commutation procedure, in response to the controller determining that the terminal voltage of the suspended phase is equal to half of the sum of terminal voltages of the two conduction phases, and entering block S9;

block S8, multiplying, by the voltage compensation module, half of the sum of terminal voltages of the two conduction phases by the voltage proportional coefficient, and compensating the zero-crossing voltage of back electromotive force of the BLDCM; determining, by the controller, the zero-crossing point of back electromotive force of the BLDCM, and executing the zero-crossing commutation procedure, in response to the controller determining that the terminal voltage of the suspended phase is equal to a compensated zero-crossing voltage of back electromotive force of the BLDCM, and entering block S9; and block S9, setting, by the controller, corresponding delay time based on a commutation point being delayed by 30° of an electrical angle from the zero-crossing point, after the zero-crossing point of back electromotive force of the BLDCM is detected by the controller; in response to the delay time reaching, performing commutation on the BLDCM, and the BLDCM entering a next operation state.

The present disclosure is not limited to the above-mentioned embodiments. It may be easily understood for those skilled in the art that, there are many alternative solutions for the compensation system and the compensation method for a zero-crossing voltage of back electromotive force of the BLDCM, without departing from the principle and scope of the present disclosure, and the protection scope of the present disclosure should be determined by the protection scope of the claim.

What is claimed is:

1. A compensation system for a zero-crossing voltage of back electromotive force of a brushless direct current motor, comprising:

a direct current power supply;

a three-phase inverter, connected to the direct current power supply and the brushless direct current motor;

a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module;

wherein the compensation system further comprises a current acquisition module connected between the direct current power supply and the controller, and the current acquisition module is configured to acquire a bus current value in response to the brushless direct current motor being in operation;

the controller comprises a voltage compensation module connected to the back electromotive force detection module, and a bus current threshold is preset in the voltage compensation module;

the voltage compensation module is configured to compare the bus current value with the bus current threshold, and output a corresponding voltage compensation signal based on a comparison result therebetween; and the controller is configured to compensate a zero-crossing voltage of back electromotive force of the brushless direct current motor based on the voltage compensation signal, and control the brushless direct current motor to perform a commutation operation.

2. The compensation system for a zero-crossing voltage of back electromotive force of a brushless direct current motor according to claim 1, wherein the voltage compensation signal is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient.

3. The compensation system for a zero-crossing voltage of back electromotive force of a brushless direct current motor according to claim 2, wherein, in response to the bus current value being less than the bus current threshold, the voltage proportional coefficient is 1, and the controller determines that the zero-crossing voltage of back electromotive force of the brushless direct current motor is half of the sum of terminal voltages of the two conduction phases; and in response to the bus current value being greater than or equal to the bus current threshold, the voltage proportional coefficient is greater than 1, and the controller compensates the zero-crossing voltage of back electromotive force of the brushless direct current motor based on the voltage proportional coefficient.

4. The compensation system for a zero-crossing voltage of back electromotive force of a brushless direct current motor according to claim 1, wherein, in response to a terminal voltage of the suspended phase being equal to half of the sum of terminal voltages of the two conduction phases, the controller determines a zero-crossing point of back electromotive force of the brushless direct current motor and executes a zero-crossing commutation procedure, wherein the terminal voltage of the suspended phase is the back electromotive force of the brushless direct current motor.

5. A compensation system for a zero-crossing voltage of back electromotive force of a brushless direct current motor, comprising:

a direct current power supply;

a three-phase inverter, connected to the direct current power supply and the brushless direct current motor;

a back electromotive force detection module configured to detect terminal voltages of three phases in response to the brushless direct current motor being in operation, wherein the three phases comprise two conduction phases and one suspended phase; and a controller, connected to the three-phase inverter through the back electromotive force detection module;

wherein the compensation system further comprises a current acquisition module connected between the direct current power supply and the controller, and the current acquisition module is configured to acquire a bus current value in response to the brushless direct current motor being in operation;

the controller comprises a voltage compensation module connected to the back electromotive force detection module, and a plurality of groups of bus current threshold intervals are preset in the voltage compensation module;

the voltage compensation module is configured to determine a group of bus current threshold intervals where the bus current value is located and output a corresponding voltage compensation signal based on the group of bus current threshold intervals; and the controller is configured to compensate a zero-crossing voltage of back electromotive force of the brushless direct current motor based on the voltage compensation signal, and control the brushless direct current motor to perform a commutation operation.

6. The compensation system for a zero-crossing voltage of back electromotive force of a brushless direct current motor according to claim 5, wherein each of the plurality of groups of the bus current threshold intervals corresponds to a group of voltage compensation signals, each of the group of voltage compensation signals is a voltage proportional coefficient of half of a sum of terminal voltages of the two conduction phases, and the zero-crossing voltage of back electromotive force of the brushless direct current motor is equal to half of the sum of terminal voltages of the two conduction phases multiplied by the voltage proportional coefficient.

7. The compensation system for a zero-crossing voltage of back electromotive force of a brushless direct current motor according to claim 6, wherein the each of the group of voltage compensation signals comprises a low threshold interval and a high threshold interval;

in response to the bus current value being in the low threshold interval, the voltage proportional coefficient is 1; and in response to the bus current value being in the high threshold interval, the voltage proportional coefficient is greater than 1.

8. The compensation system for a zero-crossing voltage of back electromotive force of a brushless direct current motor according to claim 7, wherein the high threshold interval comprises a first threshold interval, a second threshold interval, and a third threshold interval; and the voltage proportional coefficient comprises a first proportional coefficient corresponding to the first threshold interval, a second proportional coefficient corresponding to the second threshold interval, and a third proportional coefficient corresponding to the third threshold interval.

9. The compensation system for a zero-crossing voltage of back electromotive force of a brushless direct current motor according to claim 8, wherein the first threshold interval, the second threshold interval, and the third threshold interval successively increase, and the first proportional coefficient, the second proportional coefficient, and the third proportional coefficient successively increase.

10. The compensation system for a zero-crossing voltage of back electromotive force of a brushless direct current motor according to claim 9, wherein, in response to the bus current value being in the low threshold interval, the controller determines that the zero-crossing voltage of back electromotive force of the brushless direct current motor is half of the sum of terminal voltages of the two conduction phases;

in response to the bus current value being in the first threshold interval, the controller compensates the zero-crossing voltage of back electromotive force of the brushless direct current motor based on the first proportional coefficient;

in response to the bus current value being in the second threshold interval, the controller compensates the zero-crossing voltage of back electromotive force of the brushless direct current motor based on the second proportional coefficient;

in response to the bus current value being in the third threshold interval, the controller compensates the zero-crossing voltage of back electromotive force of the brushless direct current motor based on the third proportional coefficient; and in response to the bus current value exceeding the high threshold interval, the controller controls the brushless direct current motor to perform over-current shutdown protection.

11. The compensation system for a zero-crossing voltage of back electromotive force of a brushless direct current motor according to claim 7, wherein, in response to the terminal voltage of the suspended phase is equal to half of the sum of terminal voltages of the two conduction phases, the controller determines a zero-crossing point of back electromotive force of the brushless direct current motor and executes the zero-crossing commutation procedure, wherein the terminal voltage of the suspended phase is the back electromotive force of the brushless direct current motor.

12. A compensation method for a zero-crossing voltage of back electromotive force of a brushless direct current motor, wherein the compensation method is applied to a compensation system for a zero-crossing voltage of back electromotive force of a brushless direct current motor, and the compensation method comprises the following blocks:

block S1, acquiring, by a current acquisition module, a bus current value, in response to the brushless direct current motor being in operation;

block S2, acquiring in real time, by a controller, terminal voltages of three phases of the brushless direct current motor through the back electromotive force detection module, and calculating half of a sum of terminal voltages of two conduction phases;

block S3, detecting in real time, by the controller, whether the terminal voltage of the suspended phase is equal to half of the sum of terminal voltages of the two conduction phases, and at the same time, determining in real time, by the controller, a bus current threshold interval where the bus current value is located; and wherein the compensation method further comprises one of the following blocks:

block S4, determining, by the controller, the zero-crossing voltage of back electromotive force of the brushless direct current motor being half of the sum of terminal voltages of the two conduction phases, in response to the bus current value being a low threshold interval; and determining, by the controller, the zero-crossing point of back electromotive force of the brushless direct current motor, and executing the zero-crossing commutation procedure, in response to the controller determining that the terminal voltage of the suspended phase is equal to half of the sum of terminal voltages of the two conduction phases;

block S5, compensating, by the controller, the zero-crossing voltage of back electromotive force of the brushless direct current motor according to the voltage compensation signal, in response to the bus current value being a high threshold interval; and determining, by the controller, the zero-crossing point of back electromotive force of the brushless direct current motor, and executing the zero-crossing commutation procedure, in response to the controller determines that the terminal voltage of the suspended phase being equal to a compensated zero-crossing voltage of back electromotive force of the brushless direct current motor; and block S6, controlling, by the controller, the brushless direct current motor to perform over-current shutdown protection, in response to the bus current value exceeding the high threshold interval.

13. The compensation system for a zero-crossing voltage of back electromotive force of a brushless direct current motor according to claim 1, wherein the voltage compensation module comprises:

an operation module, connected to the current acquisition module and the back electromotive force detection module, and configured to compare the bus current value with the bus current threshold, and output the corresponding voltage compensation signal based on the comparison result between the bus current value and the bus current threshold; and a memory cell connected to the operation module, wherein the bus current threshold is preset in the memory cell.

14. The compensation system for a zero-crossing voltage of back electromotive force of a brushless direct current motor according to claim 5, wherein after the zero-crossing point of back electromotive force of the brushless direct current motor is detected by the operation module, the controller sets corresponding delay time based on a commutation point being delayed by 30° of an electrical angle from the zero-crossing point; in response to the delay time reaching, the commutation is performed on the brushless direct current motor, and the brushless direct current motor enters a next operation state.

15. The compensation system for a zero-crossing voltage of back electromotive force of a brushless direct current motor according to claim 1, wherein the bus current threshold is a reference for determining whether it is necessary to compensate a zero-crossing voltage of back electromotive force of the brushless direct current motor.

16. The compensation system for a zero-crossing voltage of back electromotive force of a brushless direct current motor according to claim 1, wherein the bus current threshold is 40 A.

17. The compensation system for a zero-crossing voltage of back electromotive force of a brushless direct current motor according to claim 8, wherein the low threshold interval is (0 A, 40 A], and the high threshold interval is (40 A, 80 A].

18. The compensation method for a zero-crossing voltage of back electromotive force of a brushless direct current motor according to claim 12, wherein the high threshold interval comprises a first threshold interval, a second threshold interval, and a third threshold interval; and the voltage proportional coefficient comprises a first proportional coefficient corresponding to the first threshold interval, a second proportional coefficient corresponding to the second threshold interval, and a third proportional coefficient corresponding to the third threshold interval.

19. The compensation method for a zero-crossing voltage of back electromotive force of a brushless direct current motor according to claim 18, wherein the block S5 comprises one of the following blocks:

in response to the bus current value being in the first threshold interval, the controller compensates the zero-crossing voltage of back electromotive force of the brushless direct current motor based on the first proportional coefficient;

in response to the bus current value being in the second threshold interval, the controller compensates the zero-crossing voltage of back electromotive force of the brushless direct current motor based on the second proportional coefficient; and in response to the bus current value being in the third threshold interval, the controller compensates the zero-crossing voltage of back electromotive force of the brushless direct current motor based on the third proportional coefficient.

20. The compensation method for a zero-crossing voltage of back electromotive force of a brushless direct current motor according to claim 12, wherein after the block S4 or the block S5, the compensation method further comprises:

block S9, setting, by the controller, corresponding delay time based on a commutation point being delayed by 30° of an electrical angle from the zero-crossing point, after the zero-crossing point of back electromotive force of the brushless direct current motor is detected by the controller; in response to the delay time reaching, performing commutation on the brushless direct current motor, and the brushless direct current motor entering a next operation state.

* * * * *